United States Patent
McDaniel et al.

(10) Patent No.: US 8,183,173 B2
(45) Date of Patent: May 22, 2012

(54) FAST ACTIVATING CATALYST

(75) Inventors: Max P. McDaniel, Bartlesville, OK (US); Elizabeth A. Benham, Spring, TX (US); Ted Cymbaluk, Kemah, TX (US); George Neil, Orange, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 286 days.

(21) Appl. No.: 11/963,530

(22) Filed: Dec. 21, 2007

(65) Prior Publication Data

US 2009/0163681 A1 Jun. 25, 2009

(51) Int. Cl.
*B01J 21/00* (2006.01)
*C08F 4/24* (2006.01)
*C08F 4/06* (2006.01)

(52) U.S. Cl. ......... 502/256; 502/233; 526/106; 526/130
(58) Field of Classification Search .................. 526/129, 526/72, 30, 106; 502/233, 256
See application file for complete search history.

(56) References Cited

U.S. PATENT DOCUMENTS

| | | | |
|---|---|---|---|
| 3,248,179 A | 4/1966 | Norwood |
| 3,281,405 A | 10/1966 | Hogan |
| 3,362,946 A | 1/1968 | Hogan |
| 3,446,754 A | 5/1969 | Slovik et al. |
| 3,629,216 A | 12/1971 | Iwasaki et al. |
| 3,806,500 A | 4/1974 | Karol |
| 4,022,580 A | 5/1977 | Rush |
| 4,041,224 A | 8/1977 | Hoff et al. |
| 4,151,122 A | 4/1979 | McDaniel et al. |
| 4,296,001 A | 10/1981 | Hawley |
| 4,397,769 A | 8/1983 | McDaniel et al. |

(Continued)

FOREIGN PATENT DOCUMENTS

EP 0857737 A1 8/1998

(Continued)

OTHER PUBLICATIONS

Collins et al. The activation of Phillips Cr/silica catalysts V. Stability of Cr(VI). Applied Catalysis A: General 335 (2008). pp. 252-261. Availible online at Science Direct on Nov. 29, 2007.*

(Continued)

*Primary Examiner* — David W Wu
*Assistant Examiner* — Elizabeth Eng
(74) *Attorney, Agent, or Firm* — Conley Rose, P.C.; Rodney B. Carroll; Cheryl L. Huseman

(57) ABSTRACT

A method of preparing a catalyst comprising aging a silica support in an alkaline solution to produce an alkaline aged silica support, removing at least a portion of the alkaline solution from the alkaline aged silica support to produce a dried silica support, and activating the silica support to produce a catalyst composition, wherein alkaline aging lowers the surface area of the silica support to less than about 50% of the original value and wherein activation of the silica support is carried out in batches of equal to or greater than about 500 lbs for a time period of less than about 8 hours. A method of preparing a polymer comprising alkaline aging a silica support material, adding chromium to the silica support material prior to the alkaline aging, after the alkaline aging, or both to form a chromium-silica support, rapidly activating the chromium-silica support to produce an activated olefin polymerization catalyst, contacting the activated olefin polymerization catalyst with at least one monomer in a reaction zone under conditions suitable to produce a polymer, and recovering the polymer.

25 Claims, 5 Drawing Sheets

U.S. PATENT DOCUMENTS

| | | | |
|---|---|---|---|
| 4,405,501 A | 9/1983 | Witt | |
| 4,436,882 A | 3/1984 | Witt | |
| 4,501,885 A | 2/1985 | Sherk et al. | |
| 4,547,557 A * | 10/1985 | McDaniel | 526/106 |
| 4,588,790 A | 5/1986 | Jenkins, III et al. | |
| 5,006,506 A | 4/1991 | Hsieh et al. | |
| 5,200,478 A | 4/1993 | Vogels et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 5,599,887 A * | 2/1997 | Badley et al. | 526/105 |
| 6,200,920 B1 | 3/2001 | Debras et al. | |
| 6,239,235 B1 | 5/2001 | Hottovy et al. | |
| 6,262,191 B1 | 7/2001 | Hottovy et al. | |
| 6,359,085 B1 | 3/2002 | Lhost et al. | |
| 6,489,428 B1 | 12/2002 | Debras et al. | |
| 6,559,087 B1 | 5/2003 | De Lange et al. | |
| 6,683,022 B1 | 1/2004 | De Lange et al. | |
| 6,833,415 B2 | 12/2004 | Kendrick et al. | |
| 7,223,823 B2 | 5/2007 | Lin | |
| 7,271,122 B2 | 9/2007 | Bodart et al. | |
| 7,381,778 B2 | 6/2008 | Katzen et al. | |
| 7,384,885 B2 | 6/2008 | Roger et al. | |
| 2005/0255987 A1 * | 11/2005 | McDaniel et al. | 502/38 |

FOREIGN PATENT DOCUMENTS

| | | |
|---|---|---|
| EP | 0882740 A1 | 12/1998 |
| WO | 9311173 A1 | 6/1993 |
| WO | WO 93/11173 | 6/1993 |
| WO | 0035964 A1 | 6/2000 |
| WO | WO 00/35964 | 6/2000 |
| WO | 2009085100 A2 | 7/2009 |
| WO | 2009085100 A3 | 7/2009 |

OTHER PUBLICATIONS

Bird, R. Byron, et al., "Dynamics of polymeric liquids. vol. 1: Fluid Mechanics," 2nd Edition, 1987, pp. xiii to xviii, 171-172, 1 cover page, and 1 publication page, A Wiley-Interscience Publication, John Wiley & Sons, Inc., USA.

Hieber, C. A., et al., "Shear-rate-dependence modeling of polymer melt viscosity," Sibley School of Mechanical and Aerospace Engineering, Cornell University, Ithaca, New York, Jul. 1992, pp. 931-938, vol. 32, No. 14, Polymer Engineering and Science.

Hieber, C. A., et al., "Some correlations involving the shear viscosity of polystyrene melts," Sibley School of Mechanical & Aerospace Engineering, Cornell University, Ithaca, New York, 1989, pp. 321-332, vol. 28, No. 4, Rheologica Acta.

Foreign communication from a related counterpart application—International Search Report, PCT/US2008/013497, Sep. 2, 2009, 4 pages.

Search Report for International Application No. PCT/US2008/013497, mailed Sep. 2, 2009.

* cited by examiner

FAST ACTIVATING CATALYST

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD

The present disclosure generally relates to catalysts comprising chromium and a support and methods of preparing and activating same.

BACKGROUND

Chromium supported catalysts are used for the polymerization of olefin polymers. Catalyst manufacturers prepare such catalysts by placing the chromium on a support such as silica or silica-titania. The support helps to stabilize the activity of the chromium and allows the catalyst to be shipped in an inactive form to the purchaser. Once the catalyst arrives at a polymer manufacturing site, it is activated for use in the polymerization process. Activation of these catalysts usually employ large and expensive equipment which are used to thermally treat the inactive compositions at high temperatures for extended time periods.

The production capacities of polymer manufacturers are limited by several factors, one of which is the time required for the activation of catalyst. Any improvement in the time required for catalyst activation and/or the amount of catalyst that can be activated at any one time may improve the efficiency of the overall polymer manufacturing process. Thus, there is an ongoing need to develop improved catalyst activation methods.

SUMMARY

Disclosed herein is a method of preparing a catalyst comprising aging a silica support in an alkaline solution to produce an alkaline aged silica support, removing at least a portion of the alkaline solution from the alkaline aged silica support to produce a dried silica support, and activating the silica support to produce a catalyst composition, wherein alkaline aging lowers the surface area of the silica support to less than about 50% of the original value and wherein activation of the silica support is carried out in batches of equal to or greater than about 500 lbs for a time period of less than about 8 hours.

Also disclosed herein is a method of preparing a polymer comprising alkaline aging a silica support material, adding chromium to the silica support material prior to the alkaline aging, after the alkaline aging, or both to form a chromium-silica support, rapidly activating the chromium-silica support produce an activated olefin polymerization catalyst, contacting the activated olefin polymerization catalyst with at least one monomer in a reaction zone under conditions suitable to produce a polymer, and recovering the polymer.

Further disclosed herein is a method of preparing a polymer comprising alkaline aging a silica support material, adding chromium to the silica support material prior to the alkaline aging, after the alkaline aging, or both to form a chromium-silica support, and rapidly activating the chromium-silica support produce an activated olefin polymerization catalyst, wherein rapidly activating chromium-silica support comprises heating the a temperature of equal to or greater than about 700° C. for a time period of less than about 8 hours.

Further disclosed herein is a method of preparing a catalyst comprising providing a supported chromium composition, chemically fusing the support material to produce a fused supported chromium composition, and rapidly activating the precursor catalyst composition to produce an activated olefin polymerization catalyst.

Further disclosed herein is a method of preparing a catalyst comprising aging a silica hydrogel in an alkaline solution to produce an alkaline aged silica hydrogel, removing at least a portion of the alkaline solution from the alkaline aged silica hydrogel to produce a silica xerogel, and activating the silica xerogel to produce a catalyst composition, wherein the catalyst composition has a surface area of less than about 300 $m^2/g$ and wherein activation of the silica xerogel is carried out in batches of equal to or greater than about 500 lbs for a time period of less than about 8 hours.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
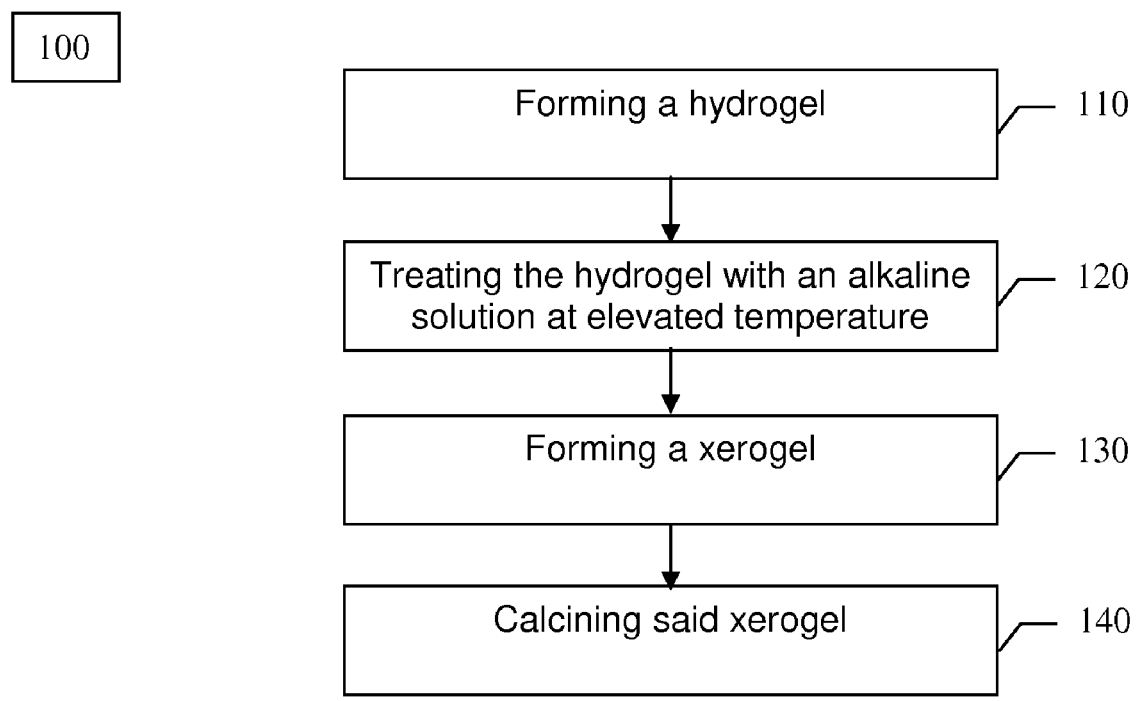
FIG. 1 is a flowchart of a method of preparing a catalyst.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods of preparing a catalyst comprising contacting a composition comprising aging a silica support in an alkaline solution to produce an alkaline aged silica support; removing at least a portion of the alkaline solution from the alkaline aged silica support to produce a dried silica support; and activating the silica support to produce a catalyst composition. Processes for the subsequent activation of said silica support may be carried out for a reduced time period when compared to compositions prepared in the absence of an alkaline treatment. Hereinafter, catalyst compositions prepared by the methodologies disclosed herein and subsequently activated are referred to as rapidly activated catalyst compositions (RACCs). The various catalyst components and the methods of preparation and activation of same are described in more detail herein.

In an embodiment, the RACC comprises a support. The support may be an inorganic oxide such as silica, or silica-titania. The support may further comprise other ingredients that do not adversely affect the RACC such as alumina, aluminophosphates, boria, magnesia, thoria, zirconia, ceria, clay, zeolites, or combinations thereof.

In an embodiment, the support comprises silica. Silica supports may be prepared using any suitable means. For example, the silica support may be prepared by contacting an aqueous solution of an alkali metal silicate with an acid to form a silica hydrogel.

In an alternative embodiment, the support comprises silica-titania. The silica-titania support may be prepared using any suitable method such as co-gelation, heterogeneous co-precipitation, and surface impregnation of silica with a titanium-containing compound such as $TiCl_3$ or $TiCl_4$. In an embodiment, the silica-titania support may have a surface area ranging from about 250 $m^2/g$ to about 600 $m^2/g$ and a pore volume ranging from about 1.0 cc/g to about 3.0 cc/g.

The support (e.g., silica or silica titania) may be present in the in an amount of equal to or greater than about 90 percent (%) by total weight of the RACC, alternatively equal to or greater than about 95%, alternatively equal to or greater than about 98%.

In an embodiment, the RACC comprises chromium which may be introduced to the RACC via contacting of a chromium-containing compound with the support. The chromium-containing compound may be one or more compounds comprising chromium in the hexavalent oxidation state (hereinafter Cr(VI)) or comprising a material suitable for conversion to Cr(VI). In an embodiment, the chromium-containing compound comprises a water-soluble chromium compound; alternatively the chromium-containing compound comprises a hydrocarbon-soluble chromium compound. The chromium-containing compound may be a chromium (II) compound, chromium (III) compound, or combinations thereof. Suitable chromium (III) compounds include, but are not limited to, chromium carboxylates, chromium naphthenates, chromium halides, chromium pyrrolides, chromium benzoates, chromium dionates, chromium nitrates, chromium sulfates, or combinations thereof. Specific chromium (III) compounds include, but are not limited to, chromium (III) isooctanoate, chromium (III) 2,2,6,6-tetramethylheptanedionate, chromium (III) naphthenate, chromium (III) chloride, chromium (III) tris(2-ethylhexanoate), chromic fluoride, chromium (III) oxy-2-ethylhexanoate, chromium (III) dichloroethylhexanoate, chromium (III) acetylacetonate, chromium (III) acetate, chromium (III) butyrate, chromium (III) neopentanoate, chromium (III) laurate, chromium (III) sulfate, chromium (III) oxalate, chromium (III) benzoate, chromium (III) pyrrolide(s), chromium (III) perchlorate, chromium (III) chlorate, or combinations thereof. Suitable chromium (II) compounds include, but are not limited to, chromous fluoride, chromous chloride, chromous bromide, chromous iodide, chromium (II) bis(2-ethylhexanoate), chromium (II) acetate, chromium (II) butyrate, chromium (II) neopentanoate, chromium (II) laurate, chromium (II) stearate, chromium (II) oxalate, chromium (II) benzoate, chromium (II) pyrrolide(s), chromous sulfate, or combinations thereof. Examples of other suitable chromium-containing compounds include tertiary butyl chromate in a hydrocarbon liquid; chromium trioxide in water; chromium acetate in water; chromium nitrate in alcohol; zerovalent organochromium compounds such as pi bonded chromium complexes, for example, dicumene chromium and dibenzene chromium; or combinations thereof. Pi bonded chromium complexes are described in U.S. Pat. No. 3,976,632, which is incorporated by reference herein in its entirety.

Chromium may be present in the RACC in an amount of from about 0.1% to about 10% based on the final weight of the RACC, alternatively from about 0.2% to about 2%, or about 1%.

An embodiment of a method 100 for the preparation of RACCs of the type disclosed herein is depicted in FIG. 1. Referring to FIG. 1, in an embodiment, a method 100 may initiate at block 110 with the formation of a hydrogel. A hydrogel is a network of silicate chains that are insoluble in water and may be found as a colloidal gel in which water is the dispersion medium. In an embodiment, the hydrogel is comprised of the support material (e.g., silica or silica-titania). Hereinafter, for simplicity, the disclosure will focus on the use of a silica hydrogel although other hydrogels of the type described herein (e.g., silica-titania) are also contemplated.

In an embodiment, the hydrogel comprises silica. A silica hydrogel may be formed by contacting an alkali metal silicate such as sodium silicate with an acid such as sulfuric acid. The contacting may be carried out under suitable conditions for example by means of mixing or agitating. The silica hydrogel may be further washed with water and/or with any suitable compound such as ammonium salt (e.g., ammonium nitrate, etc) or diluted acid to reduce the alkali metal content of the silica hydrogel. The washing may be carried out several times or until a user desired result is achieved.

The silica hydrogel may then be contacted with an alkaline solution, block 120, comprising one or more basic compounds (e.g., bases, buffer) having a pH of from about 8 to about 13, alternatively from about 9 to about 12, alternatively from about 9 to about 10 at a temperature of from about 60° C. to about 90° C., or from about 70° C. to about 85° C., or at about 80° C. Treatment of the silica hydrogel by exposure to an alkaline solution under the conditions described herein is termed alkaline aging. The alkaline solution may be comprised of any components which provide a solution pH in the disclosed ranges and are compatible with the other components of the composition. For example, the alkaline solution may comprise ammonium hydroxide, potassium hydroxide, sodium hydroxide, trialkylammonium hydroxide, sodium silicate and the like. Other suitable compounds and amounts effective to provide a solution in the disclosed pH ranges may be utilized.

Alkaline aging of the silica hydrogel may be carried out for a time period sufficient to lower the surface area of the silica support to less than about 50% of the original value, alternatively to less than about 45% of the original value, alternatively to less than about 40% of the original value, alternatively to less than about 35% of the original value of the surface area of an otherwise similar material that has not been alkaline aged. To determine the surface area of the base silica or Cr/silica, the xerogel is first dried at 200-400° C. to remove adsorbed components. For example, the support may comprise a silica support which, if dried in it's virgin (not alkaline aged) state, would produce a surface area of about 600 $m^2/g$. However, alkaline aging may reduce the surface area of the support to less than about 300 $m^2/g$, alternatively to less than about 280 $m^2/g$, alternatively to less than about 250 $m^2/g$, alternatively to less than about 225 $m^2/g$. In an embodiment, the alkaline aging is carried out for a period of time of from about 1 hour to about 24 hours, or from about 2 hours to about 10 hours, or from about 3 hours to about 6 hours.

The composition comprising a silica hydrogel and an aqueous alkaline solution may be further processed to remove all or a portion of the aqueous solution from the composition, block 130. For example, the composition may be dried using standard techniques such as thermal treatment, spray drying, or contacting with a volatile liquid organic solvent. Examples of volatile liquid organic solvents include without limitation methyl isobutylketone, ethyl acetate, sec-butyl alcohol, n-propyl alcohol, butyraldehyde, diisobutyl ether, isopropyl acetate, 3-methyl-1-butanol, 1-pentanol, 2-pentanol, 1-hexanol or combinations thereof. Drying of the silica material may convert the silica hydrogel to a silica xerogel and the resultant alkaline-aged, dried silica material is hereinafter termed a precursor catalyst composition (PCC). The PCC may subsequently be activated to form a RACC, block 140. Activation of the precursor composition may be carried out in as will be described later herein.

Chromium may be added to the precursor catalyst composition (e.g., a silica support, a silica-titania support) at any time during the synthesis process. In an embodiment, the silica support (e.g., hydrogel and/or xerogel) is further contacted with a chromium containing compound prior to, during, and/or after alkaline aging. In an embodiment, a silica hydrogel and/or xerogel is contacted with a chromium-containing compound prior to alkaline aging; alternatively a silica hydrogel and/or xerogel that is subjected to alkaline aging may be contacted with a chromium-containing compound of the type previously described herein following alkaline aging; or combinations thereof. A Cr-silica material or support is formed upon contact of a silica-containing support with a chromium-containing compound. In an embodiment, a Cr-silica hydrogel is alkaline aged and subsequently converted to a silica-Cr xerogel.

In an embodiment, the PCC is activated to produce an active catalyst, alternatively an active polymerization catalyst. The PCCs of the present disclosure may be activated using various types of activator equipment. Any vessel or apparatus may be utilized to activate the PCC including for example rotary calciners, static pan driers, or fluidized beds. Such equipment may operate in a static, batch, or continuous mode. For the static or batch mode, a vessel or apparatus containing the catalyst bed may be subjected sequentially to various stages of the activation process. For the continuous mode, the stages of the process can occur in a series of zones through which the PCC passes on its path through the activation apparatus.

In an embodiment, the PCC is activated in a fluidized bed activator. In a fluidized bed activator, gas may flow upward through a grid plate containing many small holes upon which the PCC is positioned. The gas may contain various compounds to create a desirable process conditions. The PCC may be mixed in the gas as it flows creating a fluid-like flow. This is often referred to as fluidization or fluidizing.

The activation may further comprise heating the PCC to a desired temperature in one or more stages. As used herein, the term "stages" refers to heating the PCC to a desired temperature and holding the temperature for a period of time. A stage may be performed when the PCC is in a stationary position or by moving the PCC through various locations and may comprise a ramp up time to a desired temperature and holding the PCC at that temperature for a certain hold time. For two or more stages, there will be two or more ramp up times, two or more desired temperatures, and two or more hold times. The ramp up times may be the same or different, for example the ramp up time may be instantaneous (e.g., preheated environment) to less than about 3 hours.

Commercial activation of PCCs of the type described herein typically utilize large volumes, termed commercial batches, of these materials (e.g., 100 to 1500 pounds) and require slowly heating these materials over extended periods of time to elevated temperatures (e.g., 800° C.). In an embodiment, the alkaline aging process is carried out by a commercial catalyst manufacturer in a commercial catalyst manufacturing facility, the catalyst is transported, and the activation process is carried out by a commercial polymer producer in a commercial polymerization process unit. In an embodiment, the PCC is activated in commercial batches wherein each batch comprises equal to or greater than about 500 lbs of catalyst, alternatively equal to or greater than about 750 lbs, alternatively equal to or greater than about 1000 lbs, alternatively equal to or greater than about 1250 lbs. The temperature(s) at which the PCC is activated may be adjusted to achieve a user desired result. For example, the temperature(s) may be in a range of from about 400° C. to about 1000° C., alternatively from about 600° C. to about 900° C., alternatively from about 750° C. to about 900° C. Activation of a PCC prepared as described herein may be carried out rapidly, for example in a reduced amount of time when compared to an otherwise similar composition that was not subjected to the treatments described herein. In an embodiment, the PCC may be activated for a time period of less than about 8 hours at the maximum temperature, alternatively less than about 7 hours, alternatively less than about 6 hours, alternatively less about 5 hours, alternatively less than about 4 hours, alternatively less than about 3 hours, alternatively less than about 2 hours, alternatively less than about 1 hour. If two or more stages are used, the total hold time is the summation of hold times for all the stages at the maximum temperature. Thermal activation in stages is described further in U.S. Pat. No. 4,022,580 and U.S. Patent Application Pub. No. 2005/0255987 A1 published on Nov. 17, 2005, each of which is incorporated by reference in its entirety herein.

Without wishing to be limited by theory, activation of the PCC results in dehydroxylation and annealing of the support material, which can further lower the surface area. Thus, if the alkaline aging step is enhanced and properly adjusted, one can achieve some of the same benefits of high temperature activation for long time periods. Therefore, enhanced alkaline aging can permit shorter activation times, increased activation efficiency and higher equipment output.

Activation also causes oxidation of any of the trivalent form of chromium (Cr(III)) to the hexavalent form (Cr(VI)) and then stabilization of the Cr(VI) form. As used herein, the term "stabilization" refers to the activation process resulting in the Cr(VI) form of the catalyst. The activation process may convert from about 10 to about 100% of Cr(III) to Cr(VI), or from about 30 to about 80%, or from about 35 to about 65% and yield from about 0.1 to about 1% Cr(VI), from about 0.2 to about 0.9%, or from about 0.3 to about 0.65%.

In an embodiment, RACCs of the type described herein display a decreased surface area and an increased pore diameter when compared to an otherwise similar catalyst prepared in the absence of an alkaline treatment. In some embodiments, RACCs of the type described herein display an increased pore volume when compared to an otherwise similar catalyst prepared in the absence of an alkaline treatment. For example, the surface area of the RACC may range from about 100 meters squared per gram ($m^2/g$) to about 600 $m^2/g$, or from about 200 $m^2/g$ to about 400 $m^2/g$, or from about 250 $m^2/g$ to about 350 $m^2/g$. In another embodiment, the pore diameter of the RACC ranges from about 50 Angstroms (Å) to about 400 Å, or from about 100 Å to about 350 Å, or from about 200 Å to about 300 Å. In yet another embodiment, the pore volume of the RACC ranges from about 1 cubic centimeter per gram (cc/g) to about 3, cc/g or from about 1.2 cc/g to about 2.5, cc/g or from about 1.5 cc/g to about 2 cc/g.

The catalysts and resins of the present invention (i.e. RACCs) are intended for any olefin polymerization method using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the invention, the polymerization reactor system may comprise at least one loop slurry reactor comprising vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the invention, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, co-monomer, hydrogen, co-catalyst, modifiers, and electron donors are important in producing these resin properties. Comonomer is used to control product density. Hydrogen can be used to control product molecular weight. Co-catalysts can be used to alkylate, scavenge poisons and control molecular weight. Modifiers can be used to control product properties and electron donors affect stereoregularity. In addition, the concentration of poisons is minimized because poisons impact the reactions and product properties.

The polymer or resin may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotational molding, thermoforming, cast molding and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Catalysts prepared in accordance with the present disclosure may be used for the polymerization of olefins, for example, alpha-olefins. In an embodiment, a RACC is contacted with one or more olefins in a reaction zone under suitable reaction conditions (e.g., temperature, pressure, etc.) to polymerize the olefins. Linear or branched alpha-olefins having 2 to 30 carbon atoms can be used as the olefins raw material. Specific examples of the alpha-olefins may include ethylene, propylene, 1-butene, 1-hexene, 1-octene, 3-methyl-1-butene, 4-methyl-1-pentene or the like.

Polyethylene homopolymers and copolymers of ethylene with other mono-olefins may be produced in the manner described above using the catalyst (i.e., RACC) prepared as described herein. In an embodiment, the RACC is used to produce a polyethylene homopolymer, alternatively a high density polyethylene. Polymer resins produced as disclosed herein may be formed into articles of manufacture or end use articles using techniques such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth.

The RACC may exhibit a polymerization activity comparable to that of an otherwise similar catalyst prepared in the absence an alkaline treatment. The polymerization activity refers to the grams of polymer produced per gram of solid catalyst charged per hour (g/g-h). In an embodiment, the RACC has a polymerization activity of equal to or greater than about 1000 g/g-h, or equal to or greater than about 2000 g/g-h, or equal to or greater than about 2500 g/g-h.

Hereinafter, the polymer properties disclosed are characterized with respect to a polymer prepared using an otherwise similar catalyst that was prepared in the absence of an alkaline treatment of the type described herein. In an embodiment, the RACC produces polymer having a melt index of from about 0.1 to about 10, alternatively from about 0.2 to about 5, alternatively from about 0.3 to about 1.5. The melt index (MI) refers to the amount of a polymer which can be forced through an extrusion rheometer orifice of 0.0825 inch diameter when subjected to a force of 2160 grams in ten minutes at 190° C., as determined in accordance with ASTM D 1238. In an embodiment, the RACC may be used to produce polymers having a density of greater than about 0.945 cc/g, alternatively greater than about 0.950 cc/g, alternatively greater than about 0.955 cc/g.

Polymers prepared using RACCs of the type described herein may also display an increased high load melt index. The high load melt index (HLMI) refers to the rate of flow of a molten polymer resin through an orifice of 0.0825 inches diameter when subjected to a force of 21,600 grams at 190° C., as determined in accordance with ASTM D 1238. In an embodiment, the RACC produces polymer having a high load melt index of equal to or greater than about 10, alternatively equal to or greater than about 50.

Polymers produced using the RACC prepared by the methodologies disclosed herein may be further characterized by an increased long chain branching and may exhibit a reduced die swell. Die swell refers to a phenomenon in which polymers swell in undesirable directions when passing through the exit port of an extruder. In an embodiment, the RACC produces polymer having die swell of from about 5% to about 50% when compared to an otherwise similar catalyst prepared in the absence an alkaline treatment, alternatively from about 10% to about 30%, alternatively from about 10% to about 25%.

Polymers produced using the RACC prepared by the methodologies described herein may be further characterized as having a decreased rheological breadth when compared to polymers prepared using an otherwise similar catalyst lacking an alkaline treatment. Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by the following equation:

$$E = E_o[1 + (T_\xi \dot\gamma)^a]^{\frac{n-1}{a}}$$

where
E=viscosity (Pa·s)
γ=shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region]

To facilitate model fitting, the power law constant is held at a constant value. Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume* 1, *Fluid Mechanics,* 2nd Edition, John Wiley & Sons (1987), each of which is incorporated by reference herein in its entirety. In an embodiment, a polymer prepared using an RACC of the type described herein has an CY-a value that is decreased by equal to or greater than about 5%, alternatively equal to or greater than about 7%, alternatively equal to or greater than about 10% when compared to polymers produced using otherwise similar catalysts prepared in the absence of an alkaline treatment. In an embodiment, a polymer prepared using an RACC of the type described herein has a CY-a value that is less than about 0.2, alternatively less than about 0.18, alternatively less than about 0.16, alternatively less than about 0.15.

In embodiments, the production of RACCs by the methodologies disclosed herein may result in improvements in manufacturing efficiency due to a decrease in the catalyst activation time. Without wishing to be limited by theory, moisture, released during the activation process, may hydrolyze Cr(VI) resulting in the decomposition of Cr(VI) to Cr(III). In order to mitigate this effect, commercial activation processes generally proceed over extended periods of time in order to achieve Cr(VI) stabilization. Typical commercial activation processes require approximately 36 hours to achieve a targeted maximum temperature and are held at these temperatures for a period ranging from about 12 to about 15 hours resulting an approximate conversion of 40% of Cr(III) to Cr(VI). Without wishing to be limited by theory, the alkaline solution treatment disclosed herein may fuse the silica particles, thus simulating similar results obtained by a prolonged activation period with longer hold time. Both processes create a fusion of silica particles which increases the strength of the matrix and decreases the surface area while increasing the pore radius of the RACCs.

The RACCs described herein result in catalysts that require less activation time when compared to similar catalysts lacking alkaline treatment. In an embodiment, the activation time for the RACCs described herein may be reduced by equal to or greater than about 10%, or equal to or greater than about 25%, or equal to or greater than about 50%, or equal to or greater than about 70% when compared to an otherwise similar catalyst lacking the additional alkaline treatment.

EXAMPLES

The invention having been generally described, the following examples are given as particular embodiments of the invention and to demonstrate the practice and advantages thereof. It is understood that the examples are given by way of illustration and are not intended to limit the specification of the claims to follow in any manner. A "Quantachrome Autosorb-6 Nitrogen Pore Size Distribution Instrument" was used to determine the surface area and pore volume of the supports. This instrument was acquired from the Quantachrome Corporation of Syosset, N.Y.

Example 1

The effects of loading additional catalyst in a catalyst activator on the final amount of activated catalyst was investigated. Three catalysts samples, designated Sample 1, 2, and 3, were charged to an activator in varying amounts of 150 pounds (lbs), 450 lbs, and 1050 lbs respectively. The activator was a 48-in activator. The catalysts EP 30X or 969MPI, which are commercially available from Inneos and W. R. Grace respectively, were used.

Each sample was then activated in a temperature range of 1560° F. to 1575° F. for a hold time of 12 hours with a ramp of 2.5° F./min, 0.21 ft/sec. The results are summarized in Table 1.

TABLE 1

| Sample | Charge (lbs) | Bed Height | Space Velocity | % Cr (VI) | Color |
|---|---|---|---|---|---|
| 1 | 150 | 1.1 | 18.0 | 0.8127 | Orange |
| 2 | 450 | 3.3 | 6.0 | 0.5951 | Orange |
| 3 | 1050 | 7.7 | 2.6 | 0.4491 | Green |

The results demonstrate that Cr(VI) conversion decreased as the amount of catalyst charged increased. The polymerization activity of the catalyst samples was then tested in a bench scale reactor.

Polymerization runs were made in a 2.2 liter steel reactor equipped with a marine stirrer rotating at 400 rpm. The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments. Unless otherwise stated, a small amount (0.01 to 0.10 grams normally) of the solid catalyst was first charged under nitrogen to the dry reactor. Next 1.2 liter of isobutane liquid was charged and the reactor heated up to the specified temperature, 105° C. Finally ethylene was added to the reactor to equal a fixed pressure, normally 550 psig, which was maintained during the experiment. The stirring was allowed to continue for the specified time, usually around one hour, and the activity was noted by recording the flow of ethylene into the reactor to maintain the set pressure. After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

Figure 2:
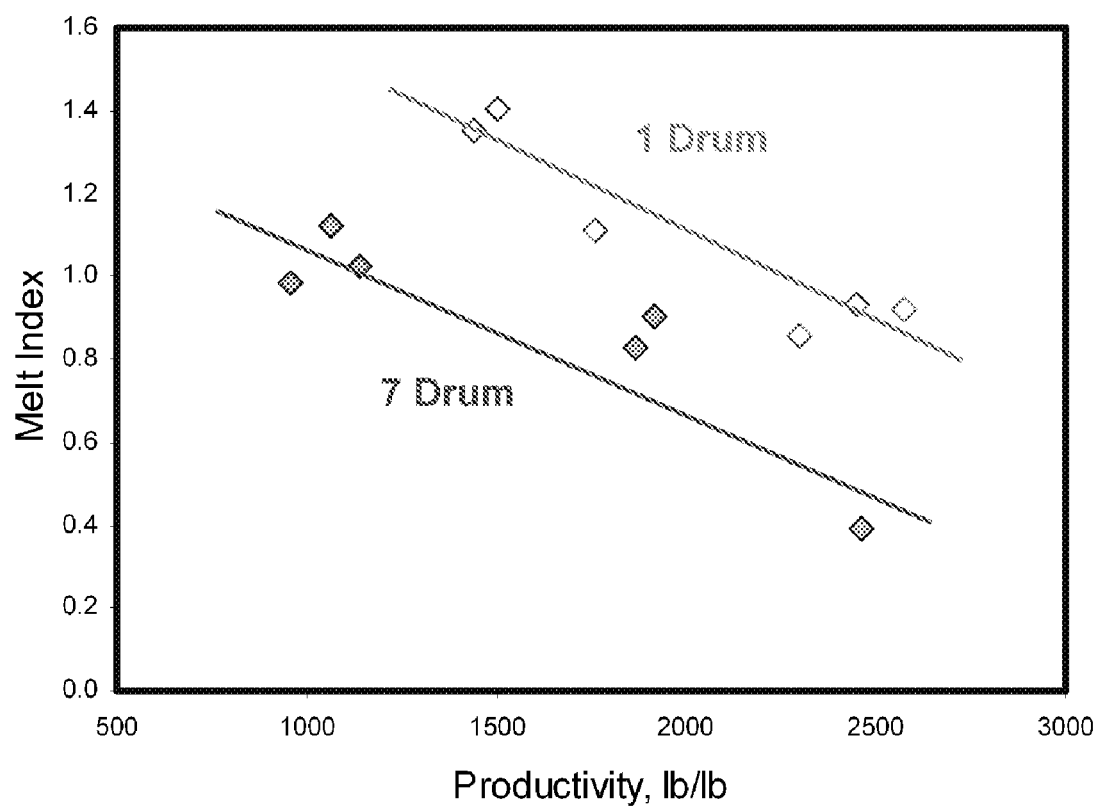
FIG. 2 is a plot of melt index as a function of productivity at various catalyst amounts for the samples from Example 1.
Figure 3:
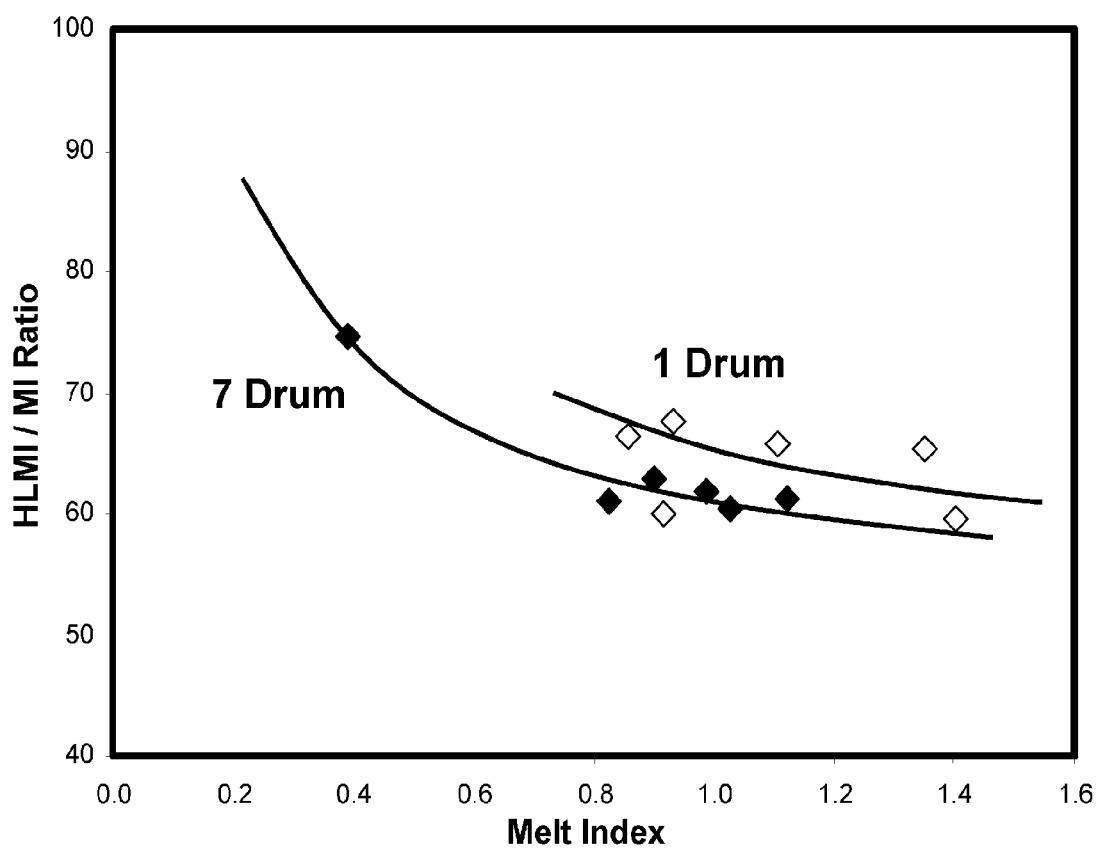
FIG. 3 is a plot of HLMI/MI as a function of melt index ratio at various catalyst amounts for the samples from Example 1.

The activity of the catalysts and physical properties of the polymers produced are illustrated in FIGS. 2 and 3. FIG. 2 is a plot of polymer melt index as a function of the productivity of the catalyst. As shown in FIG. 2, the polymer melt index decreased as the amount of catalyst charge increased. FIG. 3 is a plot of the ratio of high load melt index to melt index (HLMI/MI) ratio as a function of polymer melt index. Referring to FIG. 3, the elasticity of the resin was also impacted as the amount of catalyst charged increased. Specifically, a decrease in the HLMI/MI ratio was observed as the amount of catalyst charged increased. Collectively, these results suggest that charging more catalyst to the activator does not produce more active catalyst.

Example 2

Figure 4:
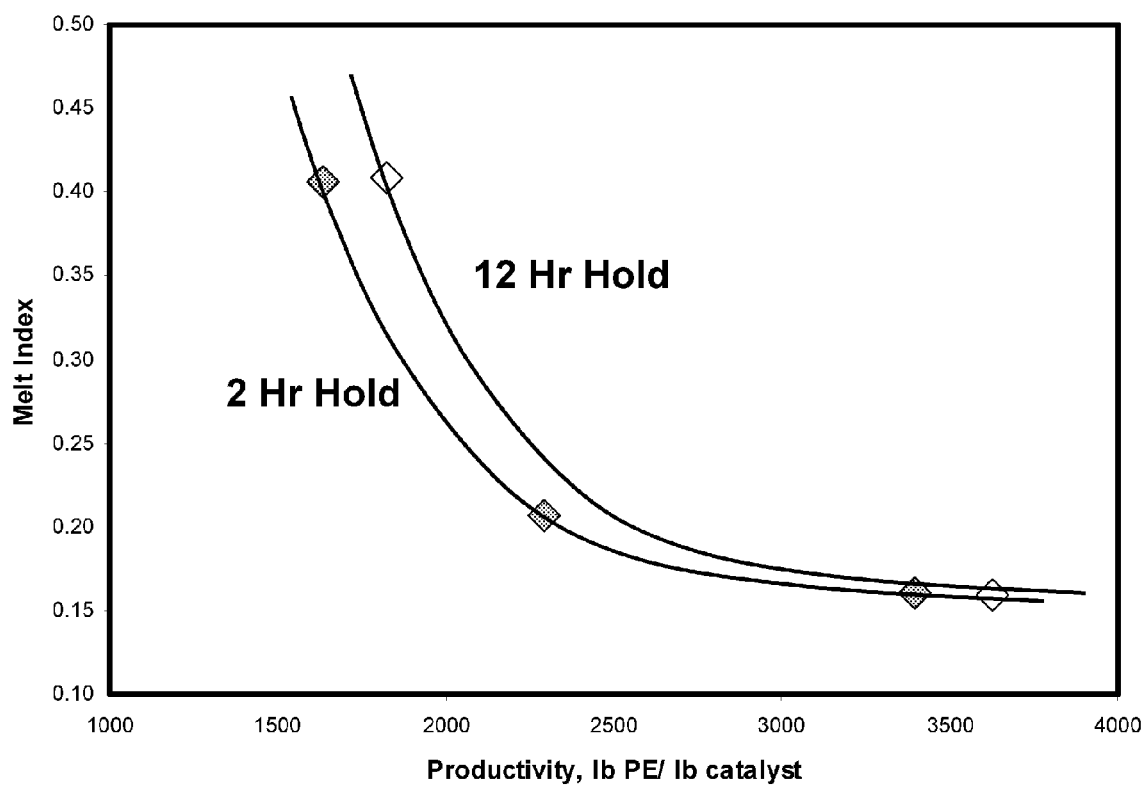
FIG. 4 is a plot of melt index as a function of productivity at various hold times for the samples from Example 2

The effect of shortening the hold time after ramp up to a targeted activation temperature during the catalyst activation was investigated. Several tests were carried out in commercial reactors in which the hold time during activation of a catalyst sample was shortened from 12 hours to 2 hours at a temperature of 1450° F. The results are illustrated in FIG. 4. The catalyst samples were subsequently used to generate polymer compositions and the MI and HLMI of the polymers determined as described in Example 1. Referring to FIG. 4, the melt index of the polymers was observed to decrease as the hold time at the targeted activation temperature was decreased from 12 to 2 hours.

Figure 5:
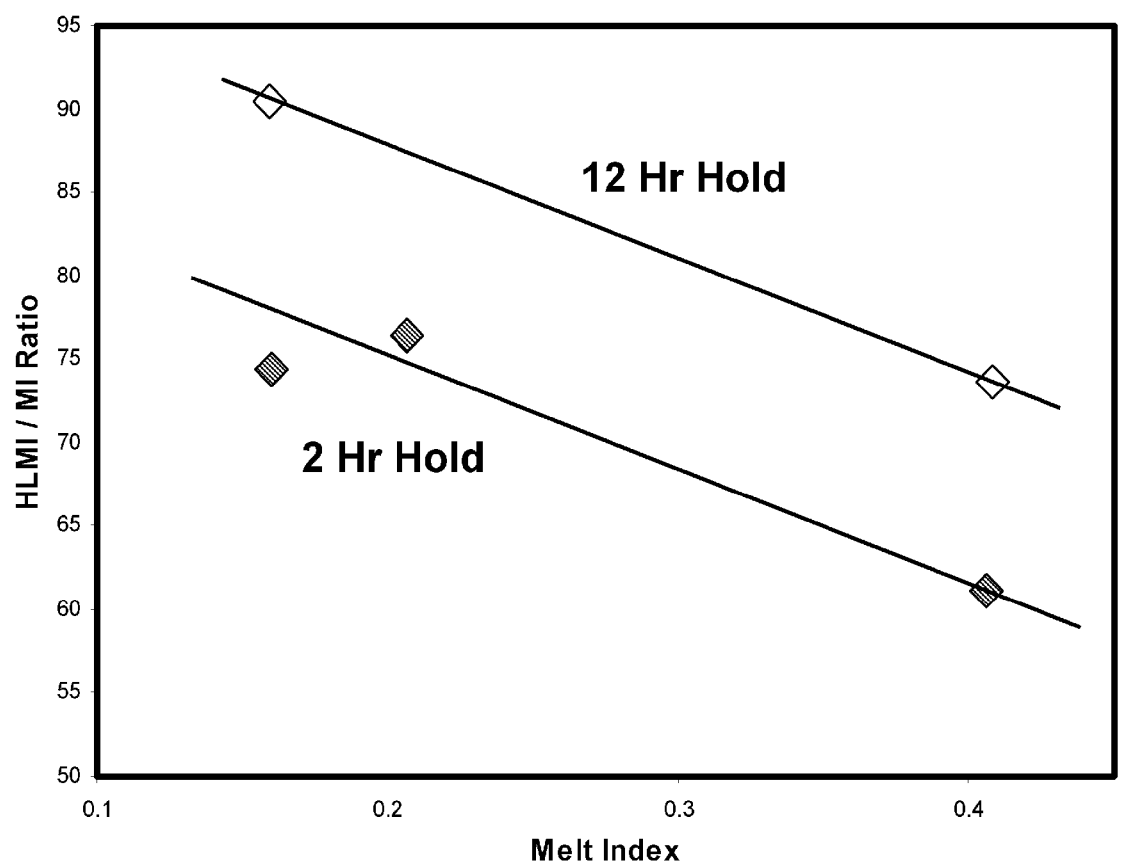
FIG. 5 is a plot of HLMI/MI ratio as a function of melt index at various hold times for the samples from Example 2.

Shortening the hold time was also observed to impact the elasticity as shown in FIG. 5 where the HLMI/MI ratio of the polymer decreased as the hold time at the targeted activation temperature decreased. The results indicate that shortening hold time at the targeted activation temperature resulted in catalyst that had not been fully activated.

Similar tests were carried using a higher target temperature of 1500° F. in order to investigate the effect of a higher temperature on the amount of catalyst activated. The results were similar to those observed with a targeted temperature of 1450° F. in that the catalysts were not fully activated.

Example 3

The effect of an alkaline treatment on the catalyst activation process was investigated using a catalyst comprising a silica-titania support. Three samples of silica-titania hydrogel, designated Samples 4, 5, and 6, were prepared. Sample 4 was not treated with an alkaline solution, while Samples 5 and 6 were treated with $NH_4OH$ at 80° C. for 28 hours. All samples were then dried by a final rinse in n-propyl alcohol followed by activation at 800° C. for a period of 6 hours. The surface area (SA), pore volume (PV) and the pore radius of the catalyst samples were determined. The catalysts were used to produce polymer compositions as described in Example 1 and the polymerization activity of the catalysts as well as the melt index (MI), high load melt index (HLMI), and HLMI/MI ratio of the polymers produced were determined and the results are tabulated in Table 2.

TABLE 2

| Sample | Treatment | SA | PV | Pore Radius, A | MI | HLMI | HLMI/MI | Activity g/g/hr |
|---|---|---|---|---|---|---|---|---|
| 4 | Not treated | 452 | 1.96 | 173 | 0.47 | 29.1 | 61.5 | 3001 |
| 5 | $NH_4OH$ | 335 | 1.99 | 237 | 1.37 | 81.7 | 59.7 | 1563 |
| 6 | $NH_4OH$ | 335 | 1.99 | 237 | 1.35 | 71.1 | 52.8 | 3174 |

As shown in Table 2, alkaline treatment of the silica-titania hydrogel decreased the surface area while increasing the pore radius of the catalyst. The polymers produced from these alkaline treated catalysts displayed an increased melt index. The HLMI/MI ratio of the polymer was observed to only decrease slightly despite a large increase in melt index. Thus, the trend indicated an increase in the elasticity of the polymer.

Example 4

The effect of varying the drying method on catalyst activation was investigated. Two samples of silica-titania hydrogel, designated Samples 7 and 8, were prepared. Sample 7 was not treated with a alkaline solution while Sample 8 was treated with $NH_4OH$ at 80° C. for 28 hours. Both samples were then dried in an oven at a temperature of 110° C. for a period of 8 hours, followed by activation at 800° C. for a period of 6 hours. The surface area (SA), pore volume (PV), pore radius and polymerization activity of these catalyst samples were determined. The catalysts were used to produce polymeric compositions as described in Example 1 and the melt index (MI), high load melt index (HLMI), HLMI/MI ratio, and a-eta of the polymeric compositions were determined. These results are presented in Table 3.

TABLE 3

| Sample | Treatment | SA | PV | Pore Radius, A | Activity g/g/hr | MI | HLMI | a-eta |
|---|---|---|---|---|---|---|---|---|
| 7 | Not treated | 361.1 | 0.675 | 75 | 758 | 0.02 | 5.6 | 0.1751 |
| 8 | $NH_4OH$ | 338.9 | 1.068 | 126 | 4191 | 0.28 | 25.1 | 0.1560 |

The results demonstrate that the melt index of the polymeric sample prepared with an alkaline treatment (Sample 8) increased and the trends for surface area, and pore radius of the catalysts, and melt index of the polymers were similar to those observed in Example 3.

While embodiments of the invention have been shown and described, modifications thereof can be made without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of preparing a catalyst comprising:
   aging a silica support in an alkaline solution to produce an alkaline aged silica support;
   removing at least a portion of the alkaline solution from the alkaline aged silica support to produce a dried silica support; and
   activating the silica support to produce a catalyst composition, wherein alkaline aging lowers the surface area of the silica support to less than about 50% of the original value, wherein the silica support has a surface area of less than about 300 m$^2$/g, wherein activation of the silica support is carried out in batches of equal to or greater than about 500 lbs for a time period of less than about 8 hours, and wherein a chromium conversion to chromium (VI) is from about 0.35 wt. % to about 0.65 wt. % based on the total weight of the catalyst when the chromium level is from about 0.2 wt. % to about 2 wt. %.

2. The method of claim 1 wherein the aging is carried out at a temperature of from about 60° C. to about 90° C.

3. The method of claim 1 wherein the alkaline solution has a pH of from about 8 to about 13.

4. The method of claim 1 wherein the aging is carried out for a time period of from about 1 to about 24 hours.

5. The method of claim 1 wherein removing at least a portion of the alkaline solution further comprises contacting the alkaline aged support with an organic solvent, thermally drying the alkaline aged support, spray drying the alkaline aged support or combinations thereof.

6. The method of claim 1 wherein commercially activating the alkaline aged composition further comprises heating the composition to a temperature equal to or greater than about 700° C.

7. The method of claim 1 wherein the silica support further comprises titania.

8. The method of claim 1 further comprising adding chromium to the silica support prior to aging, during aging, after aging, or combinations thereof.

9. A method of preparing a polymer comprising:
   alkaline aging a silica support material;
   adding chromium to the silica support material prior to the alkaline aging, after the alkaline aging, or both to form a chromium-silica support;
   rapidly activating the chromium-silica support to produce an activated olefin polymerization catalyst, wherein the chromium-silica support is rapidly activated in batches of equal to or greater than about 500 pounds, wherein activation of the chromium-silica support occurs in less than about 8 hours, wherein the silica support has a surface area of less than about 300 m$^2$/g;
   contacting the activated olefin polymerization catalyst with at least one monomer in a reaction zone under conditions suitable to produce a polymer, and wherein the chromium conversion to chromium (VI) is from about 0.35 wt. % to about 0.65 wt. % based on the total weight of the catalyst when the chromium level is from about 0.2 wt. % to about 2 wt. %; and
   recovering the polymer.

10. The method of claim 9 wherein the silica support material is alkaline aged by contact with a solution having a pH of from about 8 to about 13 at a temperature of from about 60° C. to about 90° C. for a time period of from about 1 to about 24 hours.

11. The method of claim 9 wherein the silica support further comprises titania.

12. The method of claim 9 wherein alkaline aging lowers the surface area of the silica support to less than about 50% of its original value.

13. The method of claim 9 wherein the polymer comprises polyethylene having a density of greater than about 0.945 g/cc.

14. The method of claim 13 wherein the polymer has a melt index of from about 1 to about 10.

15. The method of claim 14 wherein the polymer has a CY-a value that is less than about 0.2.

16. The method of claim 15 further comprising blow molding the polyethylene.

17. A method of preparing a polymer comprising:
   alkaline aging a silica support material;
   adding chromium to the silica support material prior to the alkaline aging, after the alkaline aging, or both to form a chromium-silica support; and
   rapidly activating the chromium-silica support to produce an activated olefin polymerization catalyst, wherein rapidly activating chromium-silica support comprises heating to a temperature of equal to or greater than about 700° C. for a time period of less than about 8 hours, wherein the chromium-silica support is rapidly activated in batches of equal to or greater than about 500 pounds, wherein the silica support has a surface area of less than about 300 m$^2$/g, and wherein the chromium conversion to chromium (VI) is from about 0.35 wt. % to about 0.65 wt. % based on the total weight of the catalyst when the chromium level is from about 0.2 wt. % to about 2 wt. %.

18. The method of claim 17 wherein the silica support material is alkaline aged by contact with a solution having a pH of from about 8 to about 13 at a temperature of from about 60° C. to about 90° C. for a time period of from about 1 to about 24 hours.

19. The method of claim 17 wherein the silica support further comprises titania.

20. The method of claim 17 wherein alkaline aging lowers surface area of the silica support to less than about 50% of its original value.

21. The method of claim 1 wherein the catalyst composition has a pore diameter of from about 50 Å to about 400 Å.

22. The method of claim 1 wherein the catalyst composition has a pore volume of from about 1 cc/g to about 3 cc/g.

23. The method of claim 1 wherein the activation is carried out for a time period of less than about 1 hour.

24. The method of claim 9 wherein the polymer has a die swell of from about 5% to about 50% when compared to an otherwise similar catalyst prepared in the absence an alkaline treatment.

25. The method of claim 1, wherein the temperature is ramped at a rate of about 2.5° F. per minute during activation of the catalyst.

* * * * *